INVENTOR.
JOHN LELIS
BY
HIS ATTORNEY

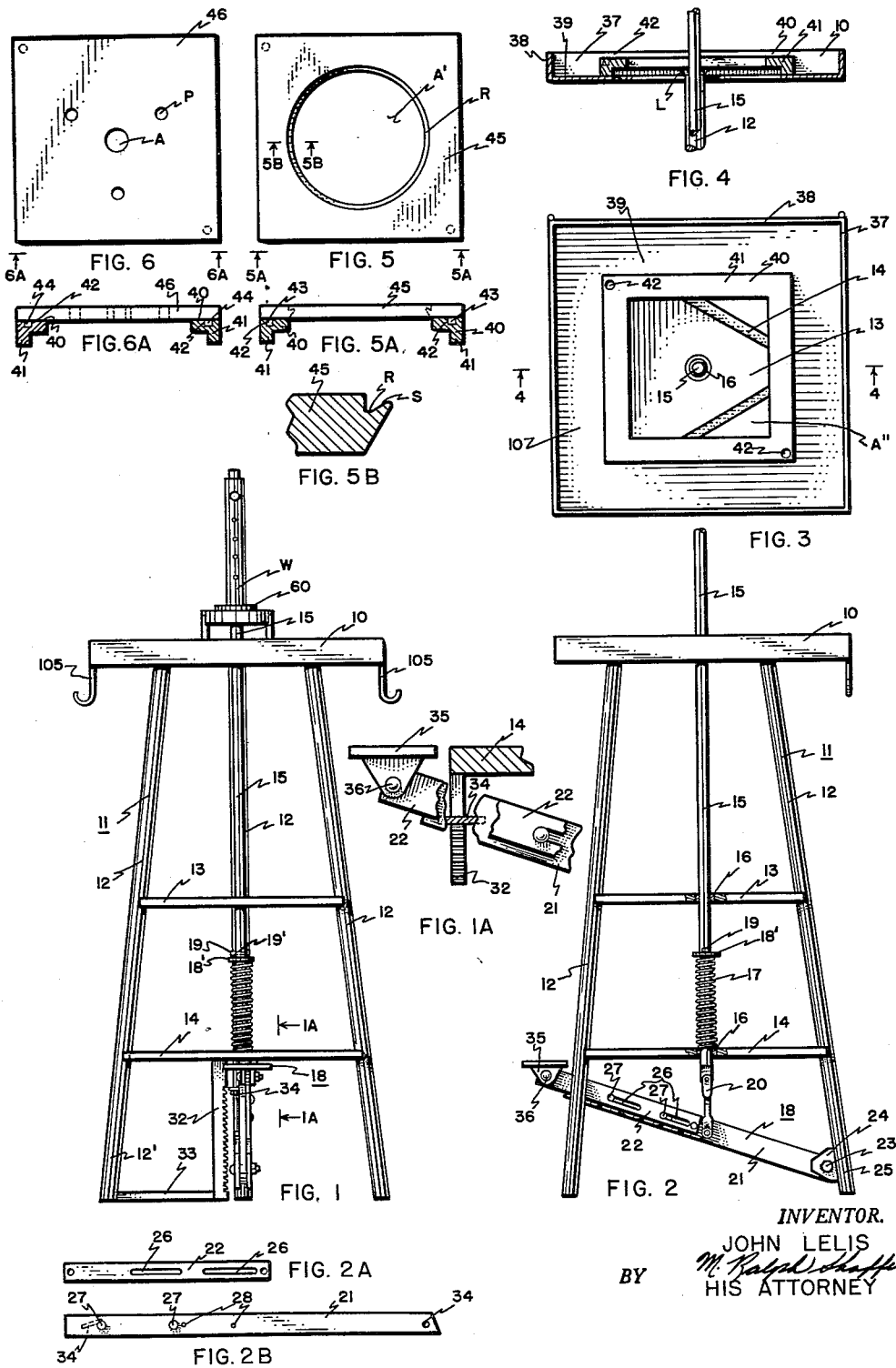
Aug. 6, 1963 — J. LELIS — 3,099,875
COMBINATION DISASSEMBLING, ASSEMBLING AND WORK HOLDING DEVICE FOR MACHINE SHOPS
Filed Dec. 22, 1959 — 3 Sheets-Sheet 1
INVENTOR.
JOHN LELIS
BY HIS ATTORNEY

Aug. 6, 1963     J. LELIS     3,099,875
COMBINATION DISASSEMBLING, ASSEMBLING AND
WORK HOLDING DEVICE FOR MACHINE SHOPS
Filed Dec. 22, 1959     3 Sheets-Sheet 3
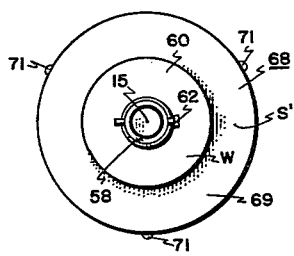
FIG. 20
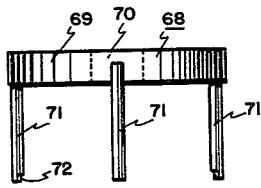
FIG. 18
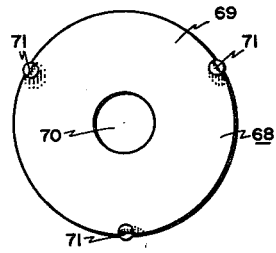
FIG. 19
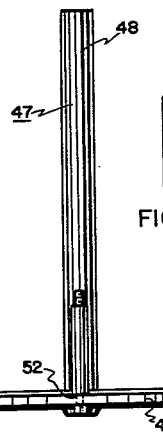
FIG. 21
FIG. 21A
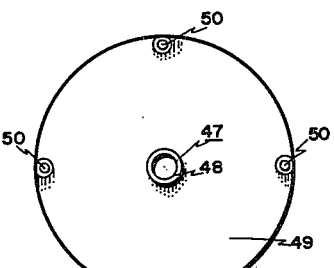
FIG. 22
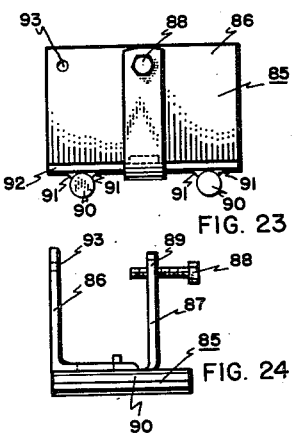
FIG. 23
FIG. 24
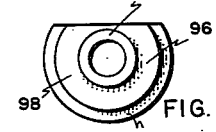
FIG. 26   FIG. 25
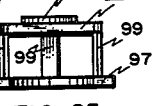
FIG. 11
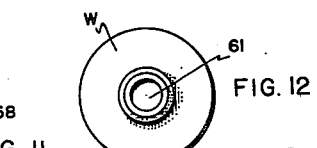
FIG. 12   FIG. 16   FIG. 17
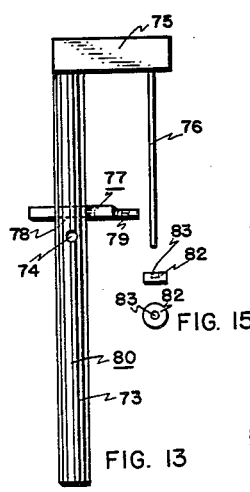
FIG. 13   FIG. 15
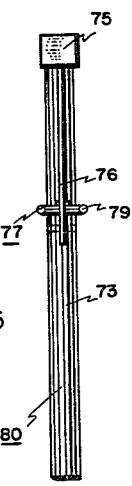
FIG. 14
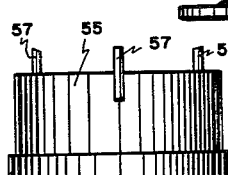
FIG. 27   FIG. 29
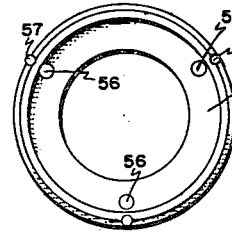
FIG. 28   FIG. 30
INVENTOR.
JOHN LELIS
BY
HIS ATTORNEY United States Patent Office 3,099,875
Patented Aug. 6, 1963

3,099,875
COMBINATION DISASSEMBLING, ASSEMBLING AND WORK HOLDING DEVICE FOR MACHINE SHOPS
John Lelis, 231 W. 6750 S., Bountiful, Utah
Filed Dec. 22, 1959, Ser. No. 861,379
2 Claims. (Cl. 29—227)

This invention relates to devices for assembling, disassembling and holding in a fixed position units such as clutch packs, accumulators, servos and the like of automatic transmissions of automobiles, for example; and, more particularly, to a machine for accomplishing the above operations on a number of different types of units in a manner which is much more satisfactory than other methods and means heretofore employed.

An object of the present invention is to provide a novel, combination disassembling, assembling, and work-holding device for machine shops which will aid, alternatively and selectively, in accomplishing the disassembly, assembly, and holding of units relating to automatic transmission units, for example.

A further object of the present invention is to provide a series of adapters, centering tools, actuators and the like to be used with the device in accomplishing a number of objectives relating to assembly, disassembly and holding for assembling many types of automotive units.

According to the present invention the device consists of a stand having a table and a frame with the latter exhibiting a plurality of legs depending from the table. A vertical actuating rod is disposed through the table, centrally thereof, and also within the frame. This actuating rod extends through the table and includes, at its lower extremity, means actuatable by foot pressure, for alternately raising and lowering this actuating rod.

One feature of the invention resides in the fact that the foot actuatable means of the device is extendable and exhibits a detent action so as to permit the application, through a lever and link system, of at least two different operating forces of differing mechanical advantage to the rod, for accomplishing a variety of objectives.

An additional feature of the invention is that a flanged work member is supplied the rod above the table, and is selectively adjustable upon the rod so as to accommodate the varying heights of equipment to be assembled or disassembled upon the table of the device.

An additional feature of the invention resides in a plurality of table plates for the table of the device, so that various objectives may be accomplished. Additionally, the table plates may be completely removed so that an elongated transmission housing may be disposed through the machine and rest upon a horizontal plate belonging to the frame of the device for purposes of assembly, for example.

Various types of centering tools, adapters, and work members are supplied for accomplishing a variety of objectives.

A further feature of the invention resides in the provision of a table plate for accomplishing a necessary "spreading" operation when, for example, disassembly of the "Jetaway" type control coupling is to be accomplished.

Various names such as "Jetaway," and so forth, used throughout this description are trade names for certain, well-known transmissions which are currently extant and the principles of operation of which are well known to those skilled in the art.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a front elevation of the device of the present invention when the same incorporates a certain flanged work member and a centering tool.

FIGURE 1A is an enlarged, fragmentary, cut-away view taken along the line 1A—1A in FIGURE 1.

FIGURE 2 is a side elevation of the device of FIGURE 1, minus the flanged work member and centering tool.

FIGURES 2A and 2B are details in plan of certain lever members illustrated in FIGURES 1 and 1A.

FIGURE 3 is a plan view of the device of the invention, again minus the flanged work member and the particular centering tool.

FIGURE 4 is a sectional view taken along the line 4—4 in FIGURE 3 and illustrates the configuration of the table of the device.

FIGURES 5 and 5A are enlarged, plan and edge elevation views, respectfully, of one table plate which may be utilized in the table of the device.

FIGURE 5B is an enlarged fragmentary section taken along the line 5B—5B in FIGURE 5.

FIGURES 6 and 6A are enlarged, plan and edge elevation views, respectively, of a second table plate which may be employed in the device.

FIGURES 11 and 12 are front elevation and plan views, respectively, of the flanged work member of the invention which at times is mounted to the actuating rod of the device.

FIGURES 13 and 14 are side and front elevations of the tool, mountable to the actuating rod of the device, which is employed in connection with conventional and dual range "Hydromatic" units to assemble the rear servo thereof.

FIGURE 15 is a plan view of a button, shown exploded from the main tool in FIGURE 13, which is employed to assemble the "Jetaway" accumulator.

FIGURES 16 and 17 are front elevation and plan views, respectively, of the centering tool which is employed in connection with the work member illustrated in FIGURE 11 to compress the clutch release spring on "Power Glide," "Dynaflow" and "Ford-O-Matic" clutch units.

FIGURES 18 and 19 are front elevation and plan views, respectively, of the centering tool employed, in assembly and disassembly operations, to compress and release the piston release spring of "Hydromatic" reverse units.

FIGURE 20 is an illustration in plan of the device shown in FIGURES 18 and 19 wherein the flanged work member of FIGURE 11 is disposed thereover and connected to the actuating rod of the device.

FIGURE 21 is a front elevation of a piston puller tool used in connection with the disassembly operation of the "Jetaway" control coupling.

FIGURE 21A is a plan view of a small tool employed to compress certain valve springs of the "Jetaway" coupling when the tool shown in FIGURE 21 is being used.

FIGURE 22 is a plan view of the tool illustrated in FIGURE 21.

FIGURES 23 and 24 are front and end elevations of a support stand used to support in vertical position the "Jetaway" accumulator when the tool shown in FIGURES 13, 14 and 15 is being employed.

FIGURES 25 and 26 are front elevation and plan views, respectively, of the centering tool used to compress the clutch release spring on "Turboglide" transmission units.

FIGURES 27 and 28 are elevation and plan views, respectively, of a centering tool which is used to accomplish the removal of the "Hydromatic" clutch drum from the brake drum of the unit.

FIGURES 29 and 30 are side elevation and plan views, respectively, of the tool used for servicing the "Ford-O-Matic" front clutch.

Figure 7:
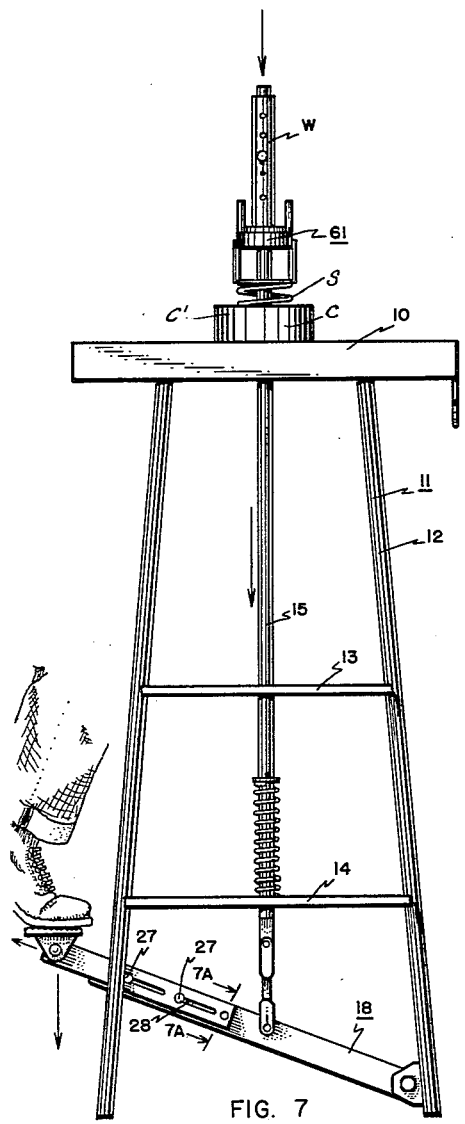
FIGURE 7 is a side elevation of the device of the present invention and illustrates the manner in which a clutch pack is assembled.

In FIGURES 1-3 the device of the invention is shown to include a table 10, a frame 11 (which includes a plurality of legs 12 with triangular plate spacers 13 and 14), a vertical rod 15 journaled within respective bushings 16, and a lever mechanism 18 which will be described hereinafter.

It is highly desirous that the frame 11 include as member 13 a rigid plate, since the same serves ideally as a support for certain types of elongated housings upon which the same may rest. However, if desired, a simple, welded, tubular construction including a central bushing may be used instead of a plate at 14. The illustrated embodiment of the invention, however, shows a triangular plate being employed at 14, and the same serves ideally for abutting one end of the return spring 17 the remaining end of which abuts washer 18' which is retained in place by pin 19 passing through rod aperture 19'. The rod 15 is provided with a link 20 at its lower extremity, this link serving to join rod 15 with lever mechanism 18. The three legs 12 are welded at their upper extremities to table 10 (the construction of which will be hereinafter described) in the manner shown in FIGURE 4 at L.

In FIGURES 1A, 2A and 2B of the drawings there is shown a lever mechanism at 18 which includes a lever member 21 and a second lever member 22. Lever member 21 is pivoted by conventional attachments 23 to bracket 24, the latter being welded to rear leg 25. Lever member 22 includes a pair of longitudinal slots 26 which receive the retainer-headed pins 27, the latter of which are secured to lever member 21. A detent action is supplied the lever member 21 and 22 as follows. Bores 28 are supplied in lever member 21, and a counterbore aperture 29 is supplied the lever member 22 (see FIGURE 7A). It will be noted in connection with FIGURES 7, 7A and also FIGURE 2B that there are two detent bores 28 supplied. More may be provided if desired. Detent pin 30 is conventional in design, as shown in FIGURE 7A, and includes a compression spring 31 which secures the two members 21 and 22 together (by pin 30) at either of the selected bores 28 in FIGURE 2B. Thus, when the bore 28 in FIGURE 2B on the left-hand side is engaged by pin 30 in FIGURE 7A, then the lever mechanism 18 is in its extended condition. When, however, the bore or depression 28 to the right in FIGURE 2B is engaged by the pin 30, the lever mechanism 18 is in its shortened condition.

FIGURE 1 illustrates that a ratchet bar 32 may be secured to member 14 and also to the leg 12' (via extension bracket 33) so that the foot actuated lever mechanism 18 may be depressed and secured in appropriate position by ratchet bar 32. This is accomplished by means of flange 34 which, as shown in FIGURE 2B is welded to the lever member 21 and which protrudes (to the left, see FIGURE 1) in a manner so as to engage the ratchet bar 32 when the lever mechanism 18 is swung slightly to the left by foot pressure. (This slight swinging of the lever mechanism 18 is easily obtainable by the lever member 21 employing a slightly enlarged aperture at 34 in FIGURE 2B, and by using attachments 23 of reduced size.)

The ratchet action of the lever mechanism 18 is conventional; the extensible character of the lever mechanism 18, however, is deemed novel.

The lever mechanism 18 includes a step 35 which is pivotally secured at 36 to lever member 22. See FIGURE 1A in this connection.

The construction of table 10 in FIGURES 1, 2, 3, and 4 will now be considered. Table 10 is welded to the several legs 12 (as at L in FIGURE 4). The table includes a peripheral member 37 exhibiting a wall 38 which in part defines the trough 39 the latter extending completely around elevated bed 40 of the table 10 as defined by the square member 41 (welded to member 38). The trough 39 is supplied in the construction of table 10 in order to capture and store springs, attachments, and the like when the same are removed from an assembly. The trough 39 renders clear the bed 40 as a working surface. The bed 40 as provided by member 41 is supplied with a pair of dowel pin apertures 42 (see FIGURES 3, 5A and 6A) which are adapted to receive the dowel pins 43 and 44 as exhibited by the interchangeable table plates 45 and 46, respectively.

The operation of the test stand as shown in FIGURE 1 is as follows. An appropriate coefficient of leverage is selected by the appropriate lengthening or shortening of lever mechanism 18, accommodated by slots 26 and 27, a suitable work member, as W in FIGURE 1, is pinned or otherwise affixed to rod 15, either before or after the equipment to be worked is placed upon the stand at table 10 or spacer plate 13, as appropriate, and the operator's foot will be used to depress lever mechanism 18 so as to draw downwardly upon rod 15, the work member (W in FIGURE 7), and any auxiliary work member used as an adapter as at 61 in FIGURE 7, so as to compress a clutch spring of clutch pack C in FIGURE 7, or to compress any other spring means of any other equipment in order that suitable, conventional retainers (not shown) may be installed in the equipment being reworked. The table 10, or plate adapters used therewith (see FIGURES 5 and 6), or plate 13, is used to support the equipment being reworked against spring compression as is present upon the downward motion of rod 15.

All of the figures simply illustrate various forms which the work supporting means, work members, and adapters may take, to accommodate various types of equipment as hereafter indicated. However, the compression operation is the same in each case as above described.

It will be seen with reference to FIGURES 3, 5 and 6 that the device of the present invention will exhibit three conditions so far as the table is concerned. Either it will be open, as shown in FIGURE 3, or the FIGURE 5 plate will be employed over bed 40, as illustrated in FIGURE 5A with the dowel pins 43 of the former engaging dowel pin apertures 42 of bed 40, or the FIGURE 6 plate will be employed, with the dowel pins 44 thereof engaging dowel pin apertures 42 of bed 40. Where the table 10 is open as in FIGURE 3, then the same is adapted to receive the elongated housings of certain types of transmissions, these adapted to rest upon the plate 13 in FIGURES 1, 2 and 3. The plate 45 in FIGURES 5, 5A and 5B is a one-purpose plate. It will be noted in FIGURE 5B that the plate 45 includes about the aperture A' a conical groove or recess R. This recess is designed for "spreading" cylindrical parts so that this assembly may be easily effectuated. In particular, this plate is designed for use in disassembling the "Jetaway" control coupling of automobiles. It will readily be seen, in connection with the above, that the spreading of the cylindrical carrier of this unit is effectuated by the fact that the pressure of work member W at the top of the carrier will cause the base thereof (not shown) to spread as it is pushed downwardly upon the inclined shoulder S of recess R in FIGURE 5B. In connection with the disassembling of the "Jetaway" control coupling, it may be noted at this point that the "puller" adapter 47 in FIGURES 21 and 22 will also be employed. This adapter includes the upstanding sleeve 48, a base flange 49 affixed thereto, and a plurality of upstanding threaded bolts 50 which pass through flange apertures 52 and spacers 51. It will be seen with reference to FIGURE 21 that the threaded bolts 50 are rotatable within their respective sleeves 51, the latter being constituted by spacers. Flange 49 has apertures 52 freely accommodating the bolts 50 and their threadable movement therewithin. The bolts 50, by way of explanation, are threaded into the piston of the control coupling once the unit shown in FIGURES 21 and 22 is disposed through aperture A' in FIGURE 5. Subsequently, the work member W in FIGURE 1 (see also FIGURE 11) is caused to press downwardly upon the sleeve 48, thus exerting a downward force upon the piston of the coupling unit (by virtue of bolts 50) and also causing a spreading of the cylindrical container by virtue of the conical recess R in FIGURE 5B. This combined action serves to accomplish the disassembly of the unit, and this in a manner much simpler and more satisfactory than other methods used heretofore.

Turning again to the main theme of the invention, it is noted that at all times there will be a rod 15 admittance aperture in the table 10. This will consist either in the square aperture A″ in FIGURE 3 when no table plate is employed, in aperture A' in FIGURE 5 when coupling disassembly of the "Jetaway" unit is being accomplished, or simply of the small aperture A in FIGURE 6 when a solid "table" is desired. In the event of the table plate 46 of FIGURES 6 and 6A being employed, then the dowel pin holes P serve to position centering, receptacle-type units such as that illustrated in FIGURES 27 and 28 which is employed, for example, to accomplish removal of the "Hydromatic" clutch drum from the brake drum of the mechanism. (This unit which is illustrated in FIGURES 27 and 28, shortly to be described, is not used for reassembly of clutch drum and brake drum of the "Hydromatic" unit. Rather, only the plate 46 in FIGURE 6 is needed in conjunction with work member W. As is illustrated in FIGURES 27 and 28, this receptacle includes a cylindrical ring 55 having a plurality of depending dowel pins 56 (to accomplish centering of the unit by virtue of the dowel pin cooperating with apertures P in FIGURE 6) and also upstanding, centering fingers 57.)

The work member W illustrated in FIGURES 1, 7, 10, 10A, 11 and 20 is shown to consist of a sleeve 58 having a plurality of vertically and mutually spaced apertures 59. Flange 60 is welded to one end of the sleeve 58 and is provided with a communicating aperture 61' which cooperates with the interior of sleeve 58. See FIGURES 11 and 12 in the above regard. Thus, pressure delivered by the operator's foot to the lever mechanism 18 (see FIGURES 7, hereinafter to be described) creates a downward translation of rod 15 and, hence, a downward movement of work member W. The lower surface S (see FIGURE 11) contacts that which is below it and urges the same downwardly by the former's pressure thereon. It will be seen with reference to FIGURE 10 that the rod has a lateral aperture 61″ which accommodates pin 62. Thus, it is important to note in FIGURE 10 that the work member W may be selectively positioned upon the rod 15 by virtue of the inclusion of pin 62 and the aperture plurality 59. Of course it will be understood that, instead of having a single aperture, the rod may have a plurality of apertures 61' (see FIGURE 10A) and the work member a single aperture 59 so as to accommodate the mounting of positioning pin 62. In either event, the work member W is selectively positionable upon rod 15. This is important since one unit may rest higher or lower upon the table 10 or plate 13 than another.

Figure 7A:
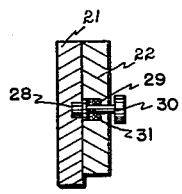
FIGURE 7A is an enlarged sectional view taken along the line 7A—7A in FIGURE 7 and illustrates the detent means of the device.

In FIGURE 7 is illustrated the manner in which the workholding device of the invention is utilized with the centering tool of FIGURES 16 and 17 to assemble a clutch pack C, for example. The clutch pack C will conventionally have a housing C' and a spring S which must be compressed before assembling of the clutch pack equipment can be completed. The tool 61 in FIGURE 16 and 17 is shown to include a lateral ring 62 having an aperture 63 adapted to slide over and thus journal the rod 15 in FIGURE 7. A plurality of upstanding centering fingers 64 includes centering shoulders 65 at the upper extremities thereof. Correspondingly, the depending fingers 66 affixed to and depending from ring 62 also have shoulders 67. Thus, the tool in FIGURES 16 and 17 may be inverted so that the fingers 64 may be used for centering the device of one particular size and the fingers 66 may be used to center a device of a slightly larger size. The tool shown in FIGURES 16 and 17, if properly sized, may be used to compress the clutch release spring on "Power Glide" and "Dynaflow" transmissions, for example. The reverse side, if properly sized, may be used for "Ford" rear clutch maintenance.

The tool shown in FIGURES 18, 19 and 20 is similar but of different size than the tool illustrated in FIGURES 16 and 17; additionally, the tool of FIGURES 18, 19 and 20 has depending fingers only. This tool is, again a centering tool that is used for assembly and disassembly operations associated with the "Hydromatic" reverse, piston release spring. As is illustrated, the tool 68 includes a ring 69 having aperture 70 and a plurality of fingers 71 welded to ring 69. The depending fingers 71 include centering shoulders 72. FIGURE 20 illustrates the manner in which the work member W in FIGURE 11 fits over and presses down upon the top surface S' of the tool 68; thus, the pressure exerted thereon by work member W will be transmitted to the fingers 71.

Figure 8:
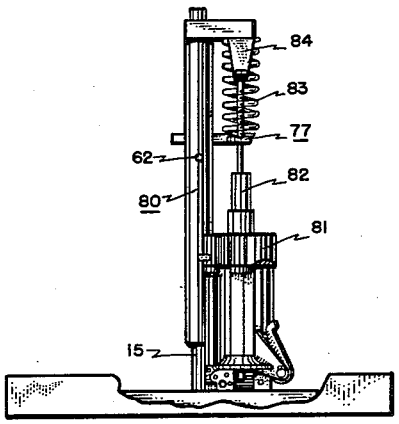
FIGURE 8 is a side elevation of the upper portion of the device when the same is used to assemble a "Hydromatic" rear servo.
Figure 9:
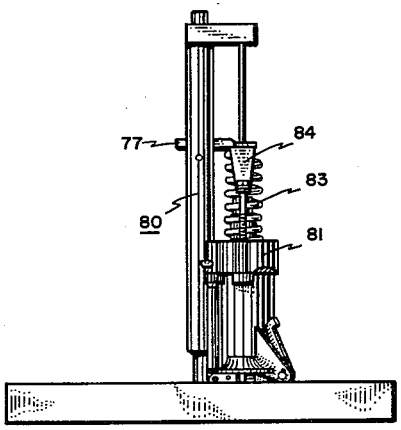
FIGURE 9 illustrates a second and subsequent step in reassembling the servo shown in FIGURE 8.
Figure 10A:
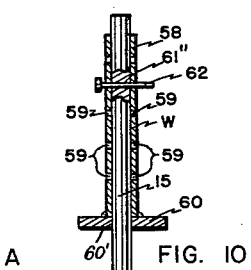
FIGURE 10A is similar to FIGURE 10, but illustrates that the hole configurations of the cooperating parts may be reversed.
Figure 10:
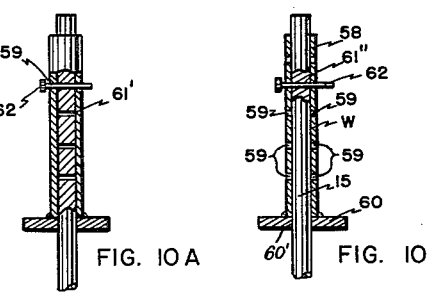
FIGURE 10 is an enlarged vertical section of the upper portion of the actuating rod of the invention when the same has mounted thereon a flanged work member of the invention.

The tool illustrated in FIGURES 8, 9, 13, 14 and 15 will now be discussed. Referring at the outset to FIGURES 13 and 14, this basic tool 80 is used to assemble the "Hydromatic" rear servo. This tool basically consists of a sleeve 73 having a line-drilled, pin receiving aperture 74, a top extension 75, and a vertical, depending finger 76 welded to extension 75. The finger 76 is spaced from and parallel to sleeve 73 as illustrated. Extension arm 77 is slidably disposed through sleeve slot 78 and includes an arcuate fork 79. The manner in which this tool is employed is shown in FIGURES 8 and 9. The basic tool 80 is mounted over the rod 15 and is secured by means of pin 62 in the usual manner. Assume that it is desired to assemble a "Hydromatic" servo. This servo is identified by 81 in FIGURES 8 and 9. (It should be noted at this juncture that the cap 82 having finger receiving bore 83, shown exploded in FIGURE 13 and in plan in FIGURE 15, will be employed to assemble the "Jetaway" accumulator. Without the cap, the basic tool 80 is used for conventional and dual range "Hydromatic" units.)

Initial depression of piston 82 of servo 81 is accomplished by lifting spring 83 and bracket 84 of the servo unit so that the same may be retained out of the way by extended, extension arm 77. Once this initial piston depression is made, then the extension arm 77 is advanced to the left so as to drop spring 83 and bracket 84. Subsequently, the arm 77 is again extended, but this time over the spring bracket 84. Thus, depression of lever mechanism 18 in FIGURE 7 by the foot of the operator will produce, simultaneously, a further depression of piston 82 and, additionally, compression of spring 83. This operative step is illustrated in FIGURE 9. It will be noted that the tool 80 is used without the employment of work member W in FIGURE 11. Similarly, the other centering tools and various adapters may themselves be pinned to rod 15 instead of using work member W. Again, the cap 82, shown exploded from the principal tool 80 in FIGURE 13 and shown also in plan in FIGURE 15, is used in conjunction with the tool 80 to assemble the "Jetaway" accumulator. In all of this operation the plate 46 in FIGURES 6 and 6A will be employed in the table. (This is true in all other situations except as noted above.)

Where the tool 80 of FIGURES 13 and 14 is used to assemble the "Jetaway" accumulator (together with cap 82 in FIGURE 15) the stand 85 in FIGURES 23 and 24 will also be employed. This stand merely consists of an angle iron segment 86 with a second angle iron segment (87) being welded to the former and provided with bolt 88 and bolt aperture 89. Cylindrical rod segments 90 are welded at 91 to the base 92 of angle iron 86. Placement hole 93 is also included in angle iron 86. This stand 85 attaches to the accumulator by means of bolt 88 and aperture 93 so that the accumulator may be rigidly supported in vertical position during the assembly operation.

The tool illustrated in FIGURE 21A is simply a stamped, sheet metal part. The tool is designated as 94 and has a fork actuating portion 95. This tool is used to compress certain valve springs in connection with the operation of disassembling the "Jetaway" control coupling when the tool shown in FIGURE 21 and the plate illustrated in FIGURE 5 are employed.

The tool illustrated in FIGURES 25 and 26 is designated 96. It includes a lower ring segment 97, and upper ring segment 98, supports 99, and upper ring 100 affixed to member 98. This tool is employed to compress the clutch release spring of the "Turbo-glide" transmission.

FIGURES 29 and 30 are front elevation and plan views of the centering and mounting adapter tool which is employed in connection with the assembly and disassembly operations upon the "Ford" front clutch; it is used to compress the clutch release spring. This adapter 101 is a one piece unit having a flared flange 102, a shoulder portion 103 and a top cylindrical portion 104. Portion 104 of the top surface 104' will be closed save for aperture 104". The purpose of the aperture is of course to center the device upon rod 15. This tool is employed to compress the clutch release spring associated with the "Ford" front clutch.

As an optional feature there may be employed in connection with the device of the present invention a pair of depending hooks 105 welded to the table 10. These hooks will prove to be very advantageous in supporting certain operational tools, parts, etc.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A machine for assembling equipment including a housing and at least one spring disposed therein which must be compressed before the assembling of said equipment can be completed, said machine including, in combination, table means for supporting said housing, said table means having a central rod receiving aperture, a vertically disposed, vertically reciprocable rod centrally passing through said aperture, means affixed to said table means for supporting the same and journaling said rod for solely vertical, reciprocative movement, means connected to said rod and actuatable by foot pressure for depressing said rod selectively, return spring means operatively coupled to said rod for returning said rod to its uppermost position after selective foot depression thereof, said rod adapted to pass through said housing and said one spring to extend thereabove, and work means releasably affixed to said rod above said one spring for selectively compressing said one spring upon the depression of said rod, preparatory to completing the assembling of said equipment.

2. Structure according to claim 1 wherein said table is provided with an elevated bed and a trough contiguous with the periphery of said elevated bed.

References Cited in the file of this patent

UNITED STATES PATENTS

| | | |
|---|---|---|
| 1,114,992 | Kalaher | Oct. 27, 1914 |
| 1,427,153 | Fisher | Aug. 29, 1922 |
| 1,575,132 | Shirley | Mar. 2, 1926 |
| 1,685,445 | Bash | Sept. 25, 1928 |
| 1,995,738 | Fish | Mar. 26, 1935 |
| 2,464,034 | Graham | Mar. 8, 1949 |

FOREIGN PATENTS

| | | |
|---|---|---|
| 206,468 | Australia | Feb. 14, 1957 |